US008855846B2

(12) United States Patent
Grzywna (10) Patent No.: US 8,855,846 B2
(45) Date of Patent: Oct. 7, 2014

(54) SYSTEM AND METHOD FOR ONBOARD VISION PROCESSING

(76) Inventor: Jason W. Grzywna, Gainesville, FL (US)

( * ) Notice: Subject to any disclaimer, the term of this patent is extended or adjusted under 35 U.S.C. 154(b) by 1096 days.

(21) Appl. No.: 11/584,448

(22) Filed: Oct. 20, 2006

(65) Prior Publication Data

US 2007/0093945 A1    Apr. 26, 2007

Related U.S. Application Data

(60) Provisional application No. 60/728,708, filed on Oct. 20, 2005.

(51) Int. Cl.
| G01C 22/00 | (2006.01) |
| G05D 1/10 | (2006.01) |
| G01C 21/00 | (2006.01) |

(52) U.S. Cl.
CPC .............. *G05D 1/101* (2013.01); *G01C 21/005* (2013.01)
USPC ........ 701/23; 701/2; 701/24; 701/25; 701/28; 701/4; 382/104; 244/3.11; 244/3.14; 244/3.16; 244/3.17; 244/189; 340/990; 340/995.25

(58) Field of Classification Search
CPC ...... B64C 39/024; B64C 13/18; B64C 19/00; G05D 1/0202
USPC .................. 701/2, 23, 24, 25, 28, 4; 340/990, 340/995.25; 244/3.11, 3.14, 3.16, 3.17, 244/76 R, 189, 190; 382/104
See application file for complete search history.

(56) References Cited

U.S. PATENT DOCUMENTS

| 4,700,307 | A | | 10/1987 | Mons et al. | |
| 5,581,250 | A | * | 12/1996 | Khvilivitzky | ................ 340/961 |
| 5,790,188 | A | * | 8/1998 | Sun | ................ 348/144 |
| 5,889,878 | A | * | 3/1999 | Togashi | ................ 382/103 |
| 6,119,976 | A | * | 9/2000 | Rogers | ................ 244/13 |
| 6,122,572 | A | * | 9/2000 | Yavnai | ................ 701/23 |
| 6,157,876 | A | | 12/2000 | Tarleton, Jr. et al. | |
| 6,678,394 | B1 | * | 1/2004 | Nichani | ................ 382/103 |
| 6,975,246 | B1 | * | 12/2005 | Trudeau | ................ 340/903 |
| 7,039,367 | B1 | * | 5/2006 | Kucik | ................ 455/96 |
| 7,061,401 | B2 | * | 6/2006 | Voos et al. | ................ 340/961 |
| 7,071,970 | B2 | * | 7/2006 | Benton | ................ 348/208.14 |
| 7,194,397 | B1 | * | 3/2007 | Bush | ................ 703/8 |

(Continued)

FOREIGN PATENT DOCUMENTS

| EP | 1335258 | 8/2003 |
| FR | 2808588 | 11/2001 |

OTHER PUBLICATIONS

Shiller et al., Mission Adaptable Autonomous Vehicles; 1991, pp143-150; INSPEC AN 4208922, Newton MA.*

(Continued)

*Primary Examiner* — John Q Nguyen
*Assistant Examiner* — Jordan S Fei
(74) *Attorney, Agent, or Firm* — Robert Plotkin, P.C.

(57) ABSTRACT

An unmanned aerial vehicle with a camera and conventional sensors, where the processor navigates the vehicle based at least in part on the image data and the sensor data. A method for navigating an unmanned aerial vehicle where a processor navigates the vehicle based at least in part on image data corrected by traditional sensor data.

7 Claims, 4 Drawing Sheets

(56) References Cited

U.S. PATENT DOCUMENTS

| | | | |
|---|---|---|---|
| 7,210,654 B1 * | 5/2007 | Cox et al. | 244/63 |
| 7,299,130 B2 * | 11/2007 | Mulligan et al. | 701/213 |
| 7,302,316 B2 * | 11/2007 | Beard et al. | 701/11 |
| 7,386,376 B2 * | 6/2008 | Basir et al. | 701/35 |
| 7,509,212 B2 * | 3/2009 | Bodin et al. | 701/206 |
| 7,526,100 B1 * | 4/2009 | Hartman et al. | 382/103 |
| 7,546,187 B2 * | 6/2009 | Bodin et al. | 701/26 |
| 2002/0022909 A1 * | 2/2002 | Karem | 701/3 |
| 2004/0026573 A1 | 2/2004 | Andersson et al. | |
| 2004/0167682 A1 * | 8/2004 | Beck et al. | 701/3 |
| 2004/0177285 A1 * | 9/2004 | Klotz et al. | 713/400 |
| 2005/0004723 A1 * | 1/2005 | Duggan et al. | 701/24 |
| 2005/0109872 A1 * | 5/2005 | Voos et al. | 244/3.17 |
| 2005/0278087 A1 * | 12/2005 | Lahn | 701/23 |
| 2006/0085106 A1 * | 4/2006 | Gaudiano et al. | 701/23 |
| 2006/0184292 A1 * | 8/2006 | Appleby et al. | 701/23 |
| 2006/0217877 A1 * | 9/2006 | Bodin et al. | 701/206 |
| 2006/0266884 A1 * | 11/2006 | Perlman | 244/99.8 |
| 2007/0023582 A1 * | 2/2007 | Steele et al. | 244/190 |
| 2007/0092143 A1 * | 4/2007 | Higgins | 382/228 |
| 2007/0093945 A1 * | 4/2007 | Grzywna et al. | 701/23 |
| 2007/0131822 A1 * | 6/2007 | Stallard | 244/190 |
| 2008/0228335 A1 * | 9/2008 | Bodin et al. | 701/26 |
| 2010/0004798 A1 * | 1/2010 | Bodin et al. | 701/2 |

OTHER PUBLICATIONS

Henrik B. Christophersen et al., "Small Adaptive Flight Control Systems for UAVs using FPGA/DSP Technology," Presented at the AIAA 3rd "Unmanned Unlimited" Technical Conference, Workshop and Exhibit, Sep. 20-23, 2004; Published by the American Institute of Aeronautics and Astronautics, Inc., 2004.

* cited by examiner

SYSTEM AND METHOD FOR ONBOARD VISION PROCESSING

RELATED APPLICATIONS

This application claims priority under 35 U.S.C. §119(e) to U.S. Provisional Application Ser. No. 60/728,708, entitled "System And Method For Onboard Vision Processing," filed on Oct. 20, 2005, which is herein incorporated by reference in its entirety.

BACKGROUND

This invention generally concerns unmanned aerial vehicles ("UAVs"), such as planes, helicopters, balloons, and the like, that are operated without need of a person being onboard.

Current large-scale UAVs, defined to be those with wingspans greater than twenty feet (e.g., the Predator and the Global Hawk) have been developed to fulfill tactical combat support roles, such as high-altitude surveillance and munitions delivery, while keeping the human pilot out of harm's way. These planes were designed to be similar in function to their on-board, human-piloted counterparts, typically having payloads of several hundred pounds, running on fuel-powered engines, and being capable of flying at high altitudes. With their large wingspan and powerful engines, these aircraft can carry the full sensor suite of a tactical aircraft and can have the additional capability to carry radars, cameras for surveillance, other environmental sensors, and even missiles and bombs, without affecting flight performance. These planes possess a small degree of autonomy (e.g., waypoint navigation, auto-takeoff, and auto-landing) but require a human in direct control from a remote station for the majority of their operations.

Mid-sized UAVs, those with wingspans from twelve to twenty feet, such as the Pointer and the Shadow, have been developed not to replace the tactical combat aircraft in service today, but to supplement the soldiers on the ground, and, in some cases, even to replace human scouts. More specifically, they were developed to provide a highly-specialized observation tool to be deployed and flown by a small group of soldiers for the purpose of inspecting forward areas or for early detection of approaching threats. These aircraft are essentially electrically-powered, remote control airplanes that may be outfitted electric motors, they are well-suited for discrete, short-range surveillance. They are portable through disassembly and the components may be carried in multiple backpacks. With a few minutes of setup time, they can be launched and provide an aerial view of the surrounding area. Some mid-sized UAVs are similar to their larger counterparts in that they have limited autonomy and are capable of performing waypoint navigation and altitude hold, which can assist their remotely located human pilots in gathering aerial video.

Small-sized UAVs, those with wingspans of less than twelve feet, have recently evolved from mid-sized UAVs. The main goal in developing small-sized UAVs has been to create systems that can be carried, launched, and operated by a single person. These systems use detachable or foldable wings, can be stored in a single backpack, rather than several, and can be launched by hand. These small aircraft are also well suited for covert operations, because they are quiet, small enough to fly into open windows or small caves, and appear as birds from a distance.

Current UAVs are limited in that, while capable of basic semi-autonomous operation, they have not yet been able to make the transition to a fully autonomous state. The principal source of this limitation is the fact that, while they can generally maneuver in an open-air environment by remote control or simple waypoint navigation, they cannot fly in the presence of obstacles such as buildings, trees, or towers, because their navigation systems are based on position alone. Primarily, this position is derived from a GPS and corresponds to a global coordinate system. These known global coordinates are used as waypoint markers by which a UAV finds its way to a destination.

Problems arise when obstacles are present between waypoint markers. One solution to this problem involves associating GPS coordinates with geographical relief maps in order to avoid areas where known geographic features are the source of obstacles. This technique offers a solution by confining the flight paths to open-air environments. It does not, however, free the aircraft to safely explore areas where the terrain is dynamic, where obstacles are largely unmapped, or where the environment is physically cluttered (the streets of a city or town, for example). In order for a UAV to enter and successfully navigate such environments, a more advanced system is needed.

Some much larger aircraft use radar-type systems to provide high-resolution, high-accuracy three-dimensional images to aid in navigation. However, radar-type systems require payload and power capabilities orders of magnitude larger than what UAVs can support. These systems also emit large levels of detectable energy during their operation.

Recent work in UAV computer vision can be divided into two major focus areas: two-dimensional analysis and three-dimensional analysis. Two-dimensional analysis usually refers to color-based, texture-based, or simple structural-based processing methods. These methods allow for image segmentation (i.e., isolating the interesting portion to reduce bandwidth) and feature extraction (i.e., identifying structures like points, lines and simple objects).

When applied in the realm of UAVs, extracting features such as the straight line of the horizon yields a vision-based approach to stabilization, and extracting features such as points or lines in the middle of an image coming from a forward-looking camera can yield a primitive obstacle detection system, such as that described in U.S. Pat. No. 5,581,250. This patent, which notes that the system disclosed therein can be used in conjunction with a UAV that utilizes an inertial reference system, also explains that the collision avoidance capability can be disabled, meaning that the obstacle detection system of the invention is a system independent from any external devices. This system provides no means to navigate in an unknown or dynamic environment or to adapt to the presence of multiple obstacles.

Three-dimensional image analysis builds on two-dimensional analysis concepts by correlating good features (e.g., image points) across multiple images to recover the three-dimensional motion of the camera and the structure of the observed scene. The recovered structure of the scene can then be used to plan the path of flight. These multiple images can be acquired simultaneously (i.e., stereo cameras) or sequentially (i.e., single camera moving relative to the scene). The reconstructions (or estimations) obtained from the feature correspondences between frames are subject to a high-degree of projective ambiguity. When compared with a native three-dimensional radar-type imaging system output, the three-dimension computer vision scene estimates, and camera motions, are low-resolution and very prone to instantaneous noise (large variations between frames).

An application of a three-dimensional image analysis to obstacle detection is described in U.S. Pat. No. 6,678,394. In this system, object distances are determined from corresponding features in simultaneously acquired (stereo) images. To mitigate resolution and noise issues, a three-dimensional reference model is created off-line in a training phase, and used as a comparison threshold for estimated object distance during run-time. This system provides a method for determining the presence of an obstacle using a three-dimensional analysis approach, but would fall short in an unknown or dynamic environment, or where multiple obstacles are present, because it relies on a priori knowledge (offline training) that would not be available in those cases.

SUMMARY OF INVENTION

The present invention provides a motion-compensated onboard vision processing system that combines inputs from at least one vision sensor and at least one motion sensor to increase the capabilities of vision-based estimation for the purpose of navigation and stabilization, and thus provides a system capable of exploring unknown environments, surviving in cluttered environments, or adapting to dynamic, obstacle-rich environments.

It is an object of the invention to enable vision-assisted stabilization and navigation.

It is a further object of the invention to enable on-board processing for all guidance, navigation, and control functions in an aerial vehicle.

It is a further object of the invention to enable a remote interface and/or data viewing device to interact with an aerial vehicle.

It is a further object of the invention to enable on-board processing and storage of all sensor data in an aerial vehicle.

It is a further object of the invention to enable remote download of sensor data in an aerial vehicle.

It is a further object of the invention to enable completely autonomous flight.

It is a further object of the invention to enable an aircraft to operate out of sight and also out of the maximum range of the ground station.

It is a further object of the invention to enable a UAV to fly autonomously even in close, physically cluttered or complex environments.

In one embodiment of the invention, an unmanned aerial vehicle includes a body with an attached lift developing surface, a processor, a sensor configured to provide sensor data to the processor, and a camera configured to provide image data to the processor, where the processor is adapted to navigate the vehicle based at least in part on the image data and the sensor data.

In another embodiment of the invention, a method for navigating an unmanned aerial vehicle includes the steps of providing a processor, a sensor configured to provide sensor data to the processor, and a camera configured to provide image data to the processor, configuring the processor to correct the image data with the sensor data, and configuring the processor to navigate the vehicle based at least in part on the corrected image data.

In another embodiment of the invention, method for navigating an unmanned aerial vehicle includes the steps of collecting sensor data concerning the vehicle's environment, state, or position, collecting image data from a camera mounted on the vehicle, correcting the image data with some or all of the sensor data, and navigating the vehicle based at least in part on the corrected image data.

BRIEF DESCRIPTION OF DRAWINGS

The accompanying drawings are not intended to be drawn to scale. In the drawings, each identical or nearly identical component that is illustrated in various figures is represented by a like numeral.

In the drawings.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter, and equivalents, as well as additional items.

As described above, the current use of vision in UAVs to navigate is problematic in all but a few isolated, ideal cases. A system that improves upon what can be estimated by vision alone is needed. Motion sensors (e.g., accelerometers, gyroscopes, and GPS) are present on modern UAVs and are used to support position-based navigation. While such sensors are unable to fully support both global navigation and local navigation (also known in some cases as "object avoidance" or "collision avoidance"), they are able to provide instantaneously precise data about the current physical state of the system. By comparison, vision estimates alone have a tendency to be instantaneously noisy for a variety of reasons, including lighting and color variations.

In the invention disclosed herein, and described below by reference to an exemplar embodiment, vision and traditional sensors are combined to address the shortcoming of prior art solutions.

The invention generally concerns a stabilization and navigation control system for a UAV that enables operation in complex, physically-cluttered environments. This system is suitable for a multitude of applications and deployment scenarios for UAVs, including surveillance, munitions delivery, target and damage inspection, and communications relay. The system may also be employed in other applications, such as in missiles and smart munitions.

In addition, the invention may be employed in connection with other types of autonomous vehicle systems, such as ground vehicles, underwater vehicles, and space vehicles. Any vehicle or device with a need for a vision-based control system would constitute a potential application.

The invention relates to a computer-vision processing system with imaging and conventional physical-state motion sensors. This system, which allows images and sensor data to be captured synchronously and processed simultaneously, is an improvement upon existing solutions in part due to its very small size.

Because one embodiment of the invention is a stabilization and navigation system for a UAV, the usefulness and advantages of the invention can be described in terms of that field of application. It should be understood that the invention is not so limited, however.

To achieve full autonomy in other than unobstructed open sky, a navigation system must be able to rapidly process data concerning an aircraft's current state and current environment and perform predictive calculations of its future state and future environment. Information concerning the current and likely future state (location, speed, direction, orientation) of an aircraft is derived from sensors (e.g., accelerometers and gyroscopes), which directly measure forces acting on the aircraft.

When information about the forces presently acting on aircraft is combined with aircraft dynamics, calculations can be performed to predict and address the forces likely to be acting on the aircraft in the future. However, when information is not available on the aircraft's environment, fully autonomous flight is impossible, except in an entirely obstacle-free environment where the scope of flight behaviors is reduced to maintaining an altitude and a compass heading.

Because larger-scale aircraft can be equipped with high-resolution, high-accuracy, and high-precision sensors such as radar, laser-radar, and sonar, these are at least theoretically capable of performing the calculations required for fully autonomous flight. However, the smaller scale and payloads that characterize many classes of UAVs impose strict limits on the weight and size of the components that enable autonomous flight. Autonomous flight on a smaller scale requires alternative methods of rapidly determining current, and calculating likely future, environments.

Recent advances in computer vision technology have made it possible to collect and process more information concerning state and environment than was ever possible before. This may be derived from a sequences of images such as by means of structure from motion, optical flow, obstacle detection, or stereo vision techniques. With a well-defined algorithm, data collected by vision sensors can be processed to provide information concerning a vehicle's current and likely future environments.

While, in some cases, vision-derived estimates may be less reliable than those provided by the large-scale aircraft sensors, such errors can be mitigated through the parallel integration, or fusion, of conventional sensors throughout the stabilization and navigation processes. In some embodiments of the present invention, computer vision and conventional vehicle-state sensors are integrated to provide a system that is capable of operating autonomously in environments where obstacles may be encountered.

In addition, in some cases, computer-vision techniques may be used to replace some of the vehicle-state sensors. For example, pixel motion techniques may be used to estimate acceleration and roll rates. These techniques can facilitate the development of smaller aerial platforms and increase overall flight durations as a result of reducing the overall weight of the vehicle.

In some embodiments, the inventive computer-vision processing system includes both imaging and physical-state sensors, allowing images and sensor data to be synchronized and processed simultaneously. In such embodiments, the system may generally consist of one or more vision sensors (e.g., visible and non-visible light cameras), one or more physical-state sensors (e.g., accelerometers, gyroscopes, and GPS), one or more processors, a means of controlling the vehicle based on signals generated by the processor, such as one for more actuators, and equipment to exchange information with a remote station.

Figure 1:
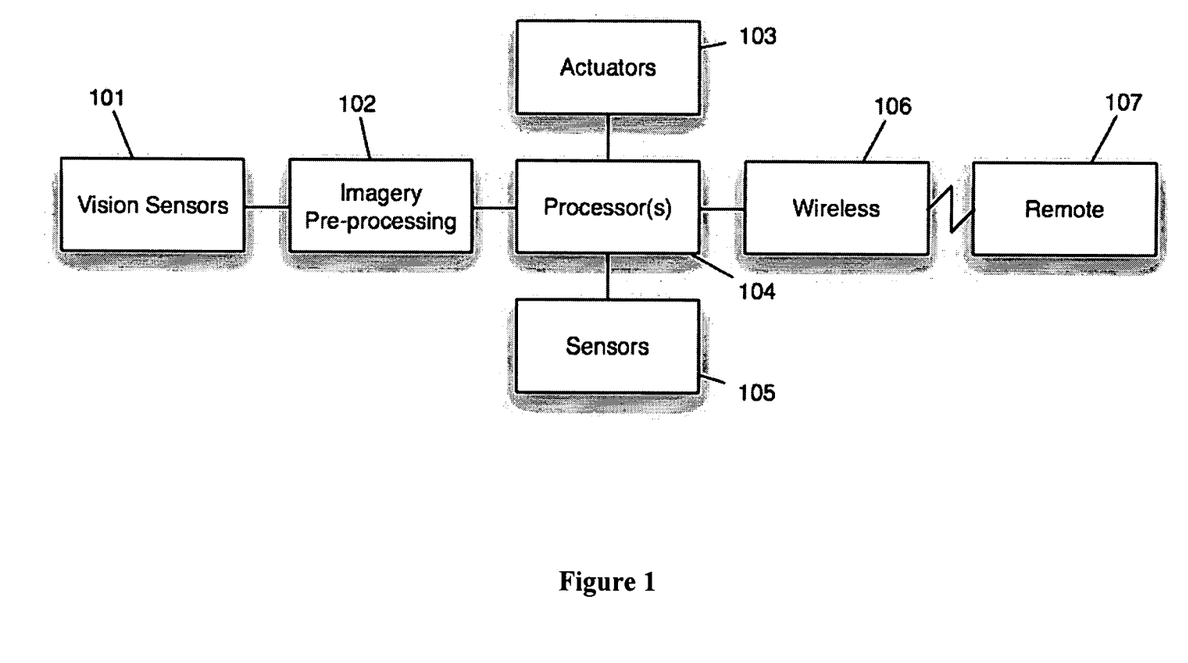
FIG. 1 is a schematic diagram of one embodiment of a UAV according to the invention.

FIG. 1 is a schematic overview of one embodiment of a system according to the present invention. This illustrative embodiment includes a vision sensor 101, a processor 104, actuators 103 connected to control surfaces for controlling the vehicle, one or more standard airplane sensors 105, one or more video pre-processors 102, a wireless transceiver 106, and a remote control station or viewer 107. Certain of these components may be omitted in other embodiments, as will be described below or would be understood by one of skill in the art.

Figure 2:
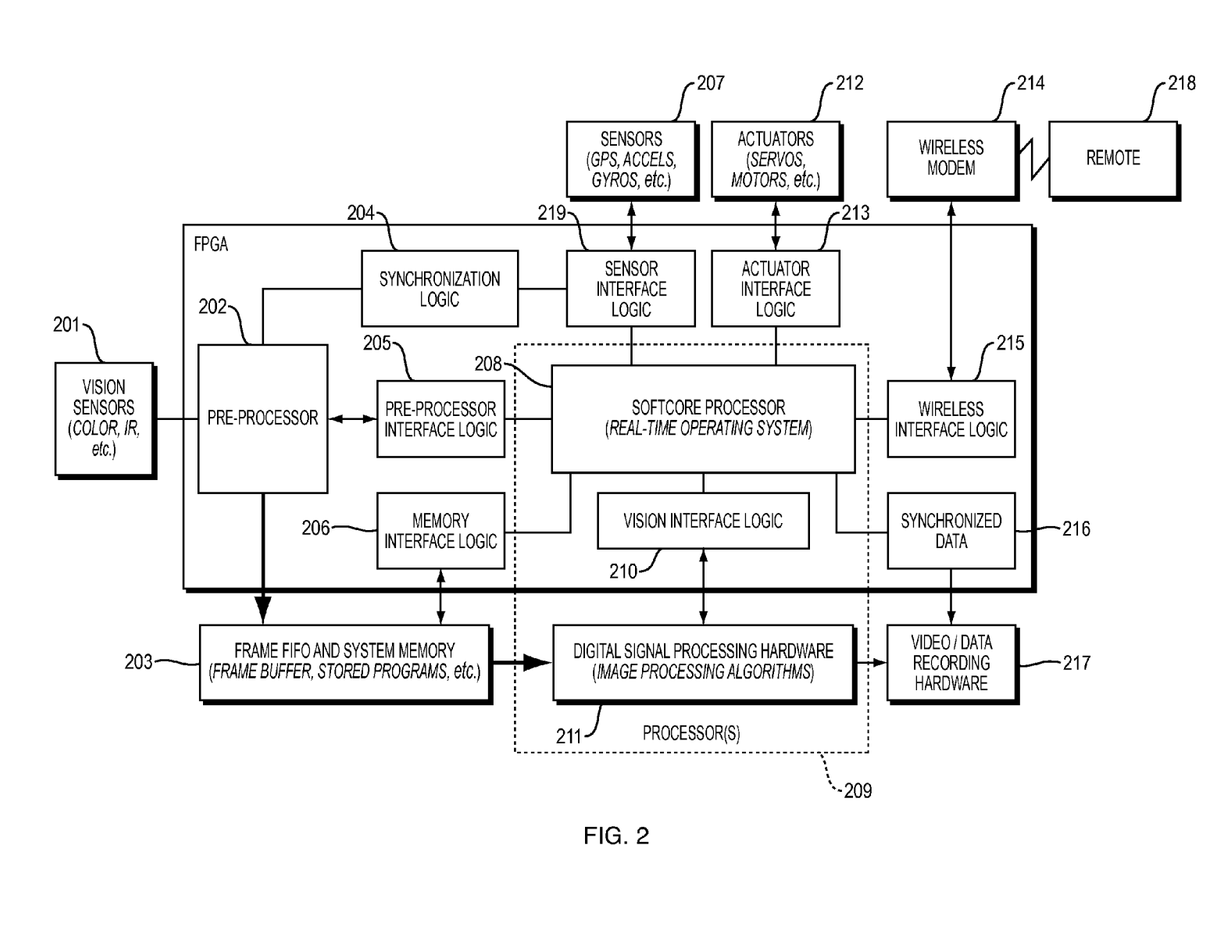
FIG. 2 is a more detailed schematic diagram of one embodiment of the system according to the present invention.

FIG. 2 is a more expanded schematic diagram of one embodiment of a system according to the present invention, showing in more detail the connections, interactions, and data flow between subsystems.

In this embodiment, image data and other sensor data enter the system via vision sensors 201 and sensors 207. Image data requires a significant amount of pre-processing (e.g., color-space conversions, sub-sampling, lighting adjustments, etc.), when compared with the other sensor data, which typically requires very little (e.g., direct measurement of acceleration or parsing of a GPS sentence).

The central processor 209 of this embodiment employs two different virtual processors: a decision-making processor 208 that performs the gathering of the sensor data, decision-making, communication, and actuation, and a vision processor 211 that is dedicated to computer vision/image processing. By "processor" it is meant any computer, processor, chip, or other device capable of storing and/or executing commands and/or otherwise manipulating data.

Programs and algorithms are stored and executed from memory 203 and through memory interface logic 206. Pre-processed image data is placed into a dedicated memory-based FIFO buffer in memory 203, which effectively "queues up" the incoming frames to be processed. The vision processor 211 analyzes the frames in memory 203, optionally making using of other sensor data via the vision interface logic 210. This vision interface logic 210 is a high-speed hardware bus interface between the two logical processors over which sensor data is passed to the vision processor and resultant data from vision-processing is passed back to the decision making processor 208.

The decision-making processor 208 integrates and synchronizes the results from the vision processor 211, with data from the sensors 207, to make decisions about the flight path and behavior of the aircraft. These decisions are carried out through actuators 212, controlled by actuator interface logic 213, to physically influence the motion of the vehicle.

A wireless transceiver 214 (such as a wireless modem) and wireless interface logic 215 may exchange information from a remote control station 218. Such information may include commanded flight path/mission instructions, current status, aerial images, and the like. By "transceiver," it is meant a transmitter, a receiver, or a transmitter and receiver combination. In addition, synchronized data block 216 and video-data recorder hardware 217 are optionally present to store information relative to the flight.

The function of the one or more onboard vision sensors, or cameras, is to capture images of the vehicle's operating environment. These cameras may be fixedly mounted to the vehicle or they may be mounted so as to be manipulated to face in different directions relative to the body of the vehicle, either in a stabilized gimbaling mechanism, a pan and tilt device, or otherwise. The cameras can be located anywhere in the vehicle, such as on the fuselage, one more wings, or elsewhere, provided that the camera can view a portion of the environment.

If navigation is to be performed, it is desirable for at least one camera to be capable of facing the direction of travel. If ground surveillance is to be performed, it is desirable for a camera to be configured to be able to view what is below and/or to the sides of the vehicle.

Some embodiments of the invention may include multiple cameras. For example, one camera may be configured for navigation and one configured for surveillance, or one camera may be configured for use at night (e.g., an infrared camera) and one for use during the day. In other embodiments, such as where weight, simplicity, or cost are primary concerns, one camera may perform multiple functions or certain functions may be omitted.

As would be appreciated by one of skill in the art, any appropriate vision sensor may be employed, whether designed to collect data in the visible or non-visible (e.g., ultra-violet or infrared) spectra. In one embodiment, the vision sensor(s) includes a charge-coupled device that generates a real-time video signal. In other embodiments, the camera may generate still images only.

In the embodiment of FIG. 1, the video signal output from the vision sensors 101 is prepared for processing prior to being delivered to the processor 104. Preparatory work performed by the video pre-processor 102 may include digitizing (in the case of a vision sensor with an analog output), splitting video, buffering frames, dropping frames, converting color spaces, changing byte orders, resizing, de-interlacing, motion correction, feature point detection, etc. The output of the video pre-processor 102 will be a "frame buffer" that contains the frames to be processed.

Figure 3:
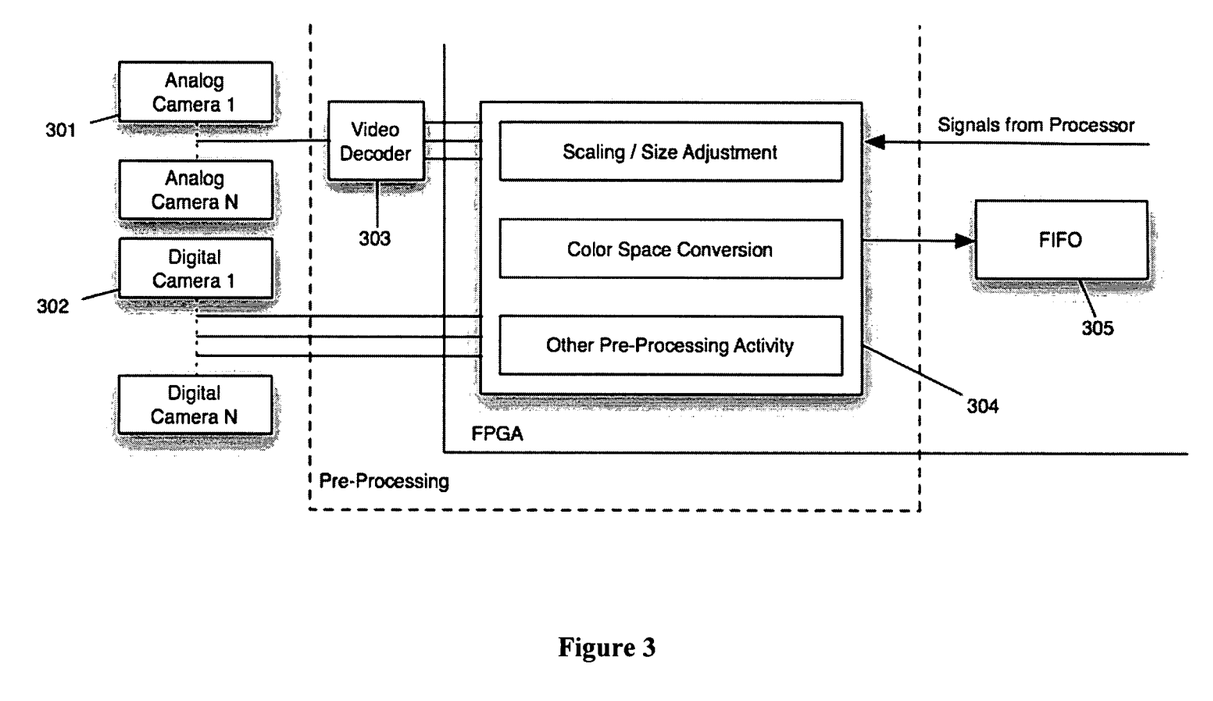
FIG. 3 is a schematic diagram of one embodiment of the pre-processing portion of the system according to the present invention.

Images are collected from vision sensors 101. Typically, these sensors can have two different types of output: analog or digital. In the case of an analog sensor, a video decoder circuit 303 may be employed to create a digital representation of the signal (NTSC analog video is decoded into YCbCr 4:2:2 digital format).

In the case of a digital sensor, the digital signal may be provided directly from the sensor itself. Due to the variety of cameras available, interfaces to both digital 302 and analog cameras 301 are described.

The raw digital signals are next passed into logical circuitry 304, shown in FIG. 3, which performs frame size reduction, lighting adjustment and color space conversion (more operations are possible). These operations are performed to reduce the overall size of the frame data and make it easier process.

Figure 4:
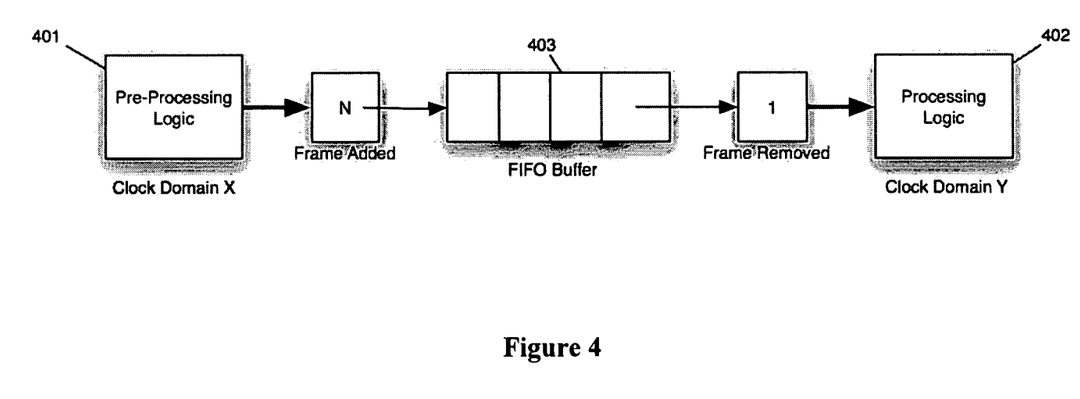
FIG. 4 is a schematic diagram of one embodiment of the frame buffering portion of the system according to the present invention.

As each captured image finishes the pre-processing stage, it is queued up for processing in a dual-clock FIFO (first-in, first-out) frame buffer 305. This FIFO, shown in more detail in FIG. 4, is implemented using memory and provides buffering and flow control between the pre-processing and processing stages. Frames are copied from the pre-processing logic block 401 into the FIFO buffer 403 and are removed to the processing logic block 402. The processing logic block 402 uses a much faster clock than the pre-processing logic block 401. The FIFO thus also allows the frame data to be passed between these different clock domains seamlessly.

As described above, the illustrative embodiment of the invention employs two different virtual processors: decision-making processor 208 that performs the gathering of sensor data, decision-making, communication, and actuation, and a vision processor 211 that is dedicated to computer vision/image processing.

In one embodiment, a FPGA-based CPU performs the first set of functions. This processor may be interfaced to all of the sensors, maintain a data structure containing sensor data, perform the control, guidance, and navigation decision-making, perform communications, actuate the airplane, and feed data to and retrieve data from the computer-vision processor.

In this embodiment, a DSP-type processor in this embodiment performs the computer vision/image processing functions. This second processor is interfaced to the guidance, navigation, and control processor via the high-speed vision interface logic 210 runs software specific to computer vision, image processing, and data processing.

The processor block integrates data from both the vision sensors 201 and the other sensors 207, and makes decisions regarding the flight path and behavior of the vehicle. The data is synchronized using hardware-based signals from the cameras, the other sensors and the synchronization subsystem 204. These signals are used to time-stamp data and guarantee acquisition in a simultaneous fashion.

The image-processing portion of the vision processor 211 utilizes image segmentation (i.e., isolating the interesting portion to reduce bandwidth) and feature extraction (i.e., identifying structures like points, lines and simple objects) algorithms, which optionally can use motion sensor data (e.g., for image stabilization). These segments and features are detected and tracked. The segments and features are then correlated across multiple images and with synchronized motion sensor data to recover the motion of the camera and the observed scene. These extracted features and recovered motions and structures are used to make decisions about navigation and stabilization of the aircraft.

In an example of motion compensation in the two-dimensional case, images and features within the images would be shifted in an opposite way from the sensed motion. This would effectively stabilize the images and features being tracked. In an example of motion compensation in the three-dimensional case, a set of stabilized features (e.g., points) would be analyzed using conventional structure from motion calculations. Then, the synchronized motion sensor data would be used to replace estimated motion parameters, thus reducing the ambiguity of the camera's motion. The control, guidance, and navigation portion of the processor can thus "see" the presence of obstacles (static or dynamic) in unknown environments and determine a safe path through cluttered environments. This path is determined using a path planning algorithm operating on the resultant data.

In other embodiments, a single processor may be used in place of the two processors to perform some or all of the above functions. In still other embodiments, these functions may be divided among more than two processors.

As shown in FIG. 2, the sensor synchronization subsystem 204 guarantees that image data and data from the standard sensors are captured simultaneously and with a measurable latency. Captured signals, timing, time-stamps, and latencies are buffered and forwarded to the processor. This system interfaces to the low-level signaling present within the vision sensors, either by direct connection, or indirect connection through the interface logic. This system also interfaces to the low-level signaling present within the standard sensors, either by direct connection, or indirect connection through the pre-processor 202 and/or the sensor interface 219.

As shown in FIG. 2, the illustrative embodiment may include memory 203. This memory may be used for buffering images (a "frame buffer"), and may also be used for storing program code, navigation instructions or data, and/or image data. In some embodiments, different memory banks (or even different types of memory) may be used for storing different types of data. In embodiments employing two separate processors, the memory may be shared between processors.

In some embodiments, some or all of the memory 203 may be removable by the operator. In one such arrangement, the vehicle may receive a flash memory card or stick, or other portable, permanent or erasable memory device that would contain navigation, flight plan, or other information.

A user may carry a number of memory cards, each of which contained navigational information defining a particular mission. For example, one card could contain data instructing the vehicle to fly straight in one direction for a fixed time or distance, conduct surveillance in a particular manner (and perhaps collect image data at predetermined intervals), and then fly back to the origin. A second card could contain data instructing the vehicle to fly in circles of increasing radius from the origin and return directly after a predetermined length of time. Data contained on other cards could be directed different missions. In the field, the user could select a mission by simply inserting the appropriate card, instead of engaging in a manual programming operation.

In another embodiment, the onboard memory may contain a plurality of navigational programs that are selected by manipulation of a switch positioned on the vehicle.

A non-inclusive list of sensors that may be employed in the inventive configuration include inertial sensors, air or differential pressure sensors, accelerometers, altimeters, inclinometers, gyroscopes, pressure sensors, temperature sensors, and GPS receivers or other motion sensors 207. A "sensor" is any device capable of providing other than image-based information about a vehicle's environment, state, or position.

The sensors interface to the decision-making processor 208 through sensor interface 219. Inertial-based sensors, such as accelerometers and gyroscopes, can directly measure physical forces acting on the airplane. Air pressure sensors can give an indication of the height-above-ground of the aircraft, while differential pressure sensors can register differences between air pressures at different locations in order to allow the approximate airspeed of the aircraft to be determined. Temperature sensors, which monitor the internal temperature of the aircraft, and thus the temperature of the other internal sensors, can be used to "temperature compensate" the other sensors to provide more accurate reading over wide temperate operating conditions.

A GPS receiver may provide information describing the current position of the vehicle on the earth's surface, and to aid in navigation. The GPS information can be used to determine global position, altitude, speed, and other information. The GPS sensor must be located somewhere on the vehicle where it has the ability to detect GPS signals.

All of these standard sensors, when employed, interface directly to the guidance, navigation and control processor, as described below.

In addition to the above, the vehicle of the illustrative embodiment includes one or more actuators 212, which are used to physically move the control surfaces of the aircraft. In some embodiments, actuators may also be used create other mechanical motions, such as moving a camera, opening a door, dropping a payload, etc. These actuators are interfaced to the processor block through actuator interface logic 213.

In the illustrative embodiment, the guidance, navigation, and control processor is interfaced to the actuators, which are connected to the control surfaces of the aircraft. The control and navigation software generates electronic signals that operate the actuators.

In other embodiments, different means may be used to actuate the control surfaces and, in still other embodiments, the vehicle can be controlled partially or wholly without the actuation of control surfaces.

In the embodiment of FIG. 1, a transceiver may be used to send and receive data wirelessly 106, such as between the vehicle and a remote control station 107. The data may include flight commands, flight data, image data, flight status information, data concerning the state of the vehicle itself (e.g., battery levels), and/or diagnostic information. In various embodiments, the wireless connection may be achieved with conventional radio waves, by infrared or other light waves, over a conventional cellular or satellite network, or by any other appropriate method.

The illustrative UAV may operate in two states, (1) "in-range," where a communication link with the remote control station is possible, and (2) "out-of-range," where no communication link is possible. Out-of-range scenarios may be created by conditions such as physical barriers, interference, distance, and where transmitters and/or receivers are damaged or powered off.

While the aircraft is "in-range" of the remote control station, a one or two way data link may be established. With the data link established, the vehicle can be controlled directly from the remote control station and/or can provide data, including image data, to the remote control station, either in real time or by transmitting data retained in the memory. With the data link established, the remote control station may also provide the vehicle with navigational data to be employed when the vehicle is out-of-range.

In one embodiment, the vehicle records data in the memory while "out-of-range" to be shared later with the remote control station when back "in-range." The data may include that obtained by various conventional sensors, as well as image data gathered by the vision sensor(s). In some cases, the vehicle may collect and provide image data that is correlated to navigational data, in order to aid in the location of a target or other feature of interest.

In contrast to current UAVs, the vehicle of the exemplary embodiment is able to fly autonomously because it uses its onboard camera and onboard processing capabilities to "see" and avoid obstacles. Although some prior art UAVs are capable of operating outside of direct control by following a predetermined flight path, none are able to intelligently avoid unknown obstacles, or adapt to changing environments, without operator control.

In the vehicle schematically illustrated in FIG. 1, the image data obtained by the camera is delivered to the processor, which analyzes it for obstacles. Upon recognizing an obstacle in the flight path, the processor can adjust the course of the vehicle, such as by manipulating control surfaces, to avoid the obstacle. After the obstacle has been successfully avoided, the processor can return the vehicle to the predetermined course. In addition to collision avoidance, the image data may be used for navigation, in some cases, and for stabilization.

Some embodiment of the invention includes a remote control station 107 in the form of a hand-held computer. In other embodiments, the remote control station make take the form of a laptop computer, a slate or tablet computer, a desktop computer, a PDA, a cellular telephone, or any other appropriate device or combination of devices. The remote control station may be hand portable, may be carried in a backpack or by other means, or may even be mounted in or on a trailer or in or on a vehicle, such a as tank, truck, car, SUV, boat, or plane.

In some embodiments, a smaller or hand portable control station may have a reduced feature set, for example only allowing an operator to control the vehicle. Larger control stations may include a more robust feature set, e.g., allowing the operator to configure the aircraft's mission parameters, retrieve data from the aircraft, and also provide control commands to the aircraft.

The remote control station may be outfitted with a processor, a display screen for viewing image data, a keyboard, joystick, or other input device for allowing interaction with and/or control of the vehicle when in range, and means for receiving and/or storing data (e.g., navigation information), such as a disc or optical drive, and/or ports for receiving memory cards or sticks.

While the vehicle is "in-range" of the control station, it can deliver information to the remote control station and can also be programmed with mission parameters and then sent "out-of-range" to perform missions. Once a mission is completed and the aircraft is once again "in-range," it can deliver the results of its mission (e.g., image data) to the remote control station.

In some embodiments, the electronics and the vehicle will be battery powered. Efficient switching-type power supplies may be used to conserve power by supplying power to the various systems as needed. Other embodiments may employ other or additional power sources, such as, for example, the use of a solar cell type of coating on the outside of the vehicle.

The following is a description of the operation of one embodiment of the invention in a UAV according to the present invention.

An operator removes the UAV and remote control station from a backpack. Both are powered up and the operator launches the aircraft by tossing it into the air. The vehicle remains aloft, circling in the immediate area of the operator, awaiting commands. On the control station, the operator runs software showing, on the display of the control station, a localized geographical map of the surrounding area with an icon representing the plane. The operator establishes a "mission" by clicking on the electronic map shown on the display to set navigational waypoints. At the final waypoint before the plane is to return to the operator, the operator specifies that the vehicle is to search for a target. After the "mission" is fully specified, the operator clicks a button and uploads the parameters to the aircraft using the wireless data link. The vehicle flies away in the direction of the first waypoint.

After the vehicle has left on its mission, the operator may track the vehicle's progress on the control station. The vehicle remains in contact with the remote control station as long as it is in range.

Once the plane is out of range of the control station, the operator cannot see the position of the plane on the map in real-time, but can still see an approximate predicted position based on the intended speed of the plane and the elapsed time. This is advantageous when the vehicle is on a long mission, because the operator will have some idea about when and where the plane will return.

During flight, the onboard processor is continuously stabilizing the plane using its sensors and processing video from the camera. Depending on the goals of the mission, the plane may be searching for targets, tracking a target, mapping the ground along its flight path, or performing other tasks.

Throughout the flight, the vehicle reacts to obstacles in its path by intelligently modifying its course to avoid them. Course modification may take the form of steering around an obstacle or increasing (or decreasing) altitude. Once the obstacle has been successfully avoided, the vehicle resumes its programmed flight path. For example, should the camera data reveal a previously unknown structure in the flight path, the processor will determine a clear course around the object and modify its heading accordingly. While flying on the modified heading, the vehicle will continuously check to determine whether other obstacles are present and will resume its programmed flight path once it has passed all obstacles.

When the vehicle reaches its final waypoint, the one where it was instructed to search for a target, it circles the area in an attempt to locate a targeted object. Once the object is found, the vehicle decreases its altitude, collecting image data as instructed, and then returns to altitude and begins to fly home.

As the vehicle nears home, the remote control panel indicates to the operator that the plane is now within signal range and the real-time position of the plane is displayed on the control panel screen. The remote control station will also indicate that the plane has new data available to the operator. At that point, the operator may begin downloading that data while the plane is still en route. Images obtained by the vehicle can be used by the operator directly, or they can be forwarded to a command center.

Eventually, the plane will return to the operator's position and begin to circle overhead waiting for new commands. At that point, the operator can either upload new data for a new mission or instruct the vehicle to land using the control station. When the operations are complete, the operator powers off both the plane and control station and places them back in the backpack.

While reduced payloads characteristic of small UAVs allow for vision-based navigation techniques, as described above, it should be noted that these technologies have many advantages (passive vs. active sensors, size/power requirements, etc) in their own right and may be appropriate for deployment on larger vehicles.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An unmanned aerial vehicle (UAV) comprising:
   a sensor;
   a camera;
   wings having a wingspan of less than twelve feet;
   a plurality of actuators;
   a plurality of control surfaces;
   a digital signal processor (DSP) vision processor;
   a field-programmable gate array (FPGA) device comprising a softcore decision-making processor;
   a frame buffer coupled to the DSP vision processor and the FPGA device;
   means for using the FPGA device to synchronously capture image data from the camera and sensor data from the sensor, wherein the captured image data represents a sequence of images of the UAV's operating environment, and wherein the sensor data represents a current physical state of the UAV;
   means for using the FPGA to pre-process the captured image data to produce pre-processed image data; and
   means for buffering the pre-processed image data in the frame buffer;
   wherein the DSP vision processor comprises means for performing targeting on the pre-processed image data to produce targeting output and performing geo-location on the targeting output to produce geo-location output;
   wherein the FPGA device comprises means for processing the targeting output to perform target tracking by providing signals to the plurality of actuators;

wherein the plurality of actuators comprises means for physically moving the plurality of control surfaces of the UAV in response to the signals; and wherein the means for processing the targeting output comprises means for processing the targeting output and the geo-location output to perform target tracking by providing signals to the plurality of actuators.

2. The UAV of claim 1, further comprising a gimbal, and wherein the plurality of actuators further comprises means for physically moving the gimbal in response to the signals.

3. The UAV of claim 1, wherein the sensor data comprises data from at least one of an accelerometer, an inclinometer, an altimeter, a gyroscope, a pressure sensor, a temperature sensor, and a GPS receiver.

4. The UAV of claim 1, wherein the image data comprises data from the non-visible spectrum.

5. The UAV of claim 1, wherein the image data comprises data from the ultra-violet spectrum.

6. The UAV of claim 1, wherein the image data comprises data from the infrared spectrum.

7. The UAV of claim 1, further comprising:
means for recording the sensor data and the camera data on-board the unmanned aerial vehicle during a state in which the unmanned aerial vehicle is out-of-range of a remote control station; and
means for transmitting the recorded sensor data and camera data with the remote control station when the unmanned aerial vehicle becomes in-range of the remote control station.

\* \* \* \* \*